United States Patent [19]

Sessions

[11] Patent Number: 5,199,677
[45] Date of Patent: Apr. 6, 1993

[54] TREE STAKE STABILIZER

[76] Inventor: James R. Sessions, 127 Thayer Way, Vallejo, Calif. 94589

[21] Appl. No.: 787,410

[22] Filed: Nov. 4, 1991

[51] Int. Cl.$^5$ .............................................. A01G 17/14
[52] U.S. Cl. ...................................... 248/218.4; 47/42; 248/299; 248/351
[58] Field of Search .................... 47/42, 43; 248/218.4, 248/298, 299, 351, 354.1, 354.5, 354.3, 500, 505, 507, 508, 68.1

[56] References Cited

U.S. PATENT DOCUMENTS

| | | | |
|---|---|---|---|
| 535,887 | 3/1895 | Brown | 248/351 X |
| 2,611,566 | 9/1952 | Landis | 248/299 X |
| 2,757,889 | 8/1956 | Cady | 248/505 X |
| 2,937,839 | 5/1960 | Randolph | 248/299 X |
| 3,136,515 | 6/1964 | Potruch | 248/68.1 X |
| 3,833,201 | 9/1974 | Dill | 248/218.4 X |
| 4,658,737 | 4/1987 | Weissberg | 248/351 X |
| 4,852,299 | 8/1989 | Smoak et al. | 47/42 |

FOREIGN PATENT DOCUMENTS

| | | | |
|---|---|---|---|
| 533074 | 11/1954 | Belgium | 248/505 |
| 1561432 | 3/1969 | France | 248/354.5 |
| 71758 | 2/1953 | Netherlands | 248/505 |

*Primary Examiner*—Carl D. Friedman
*Assistant Examiner*—Derek J. Berger
*Attorney, Agent, or Firm*—Linval B. Castle

[57] ABSTRACT

A tree stake stabilizer for maintaining rigid and parallel a pair of commercial tree stakes includes a pair of stake-grasping tubular collars interconnected by an adjustable length bar that is arcuate to form a horizontal offset to clear a growing tree.

3 Claims, 1 Drawing Sheet

TREE STAKE STABILIZER

CROSS-REFERENCE TO RELATED APPLICATION

This application is related to design application Ser. No. 07/677,968, filed Apr. 1, 1991.

BRIEF SUMMARY OF THE INVENTION

This invention relates generally to landscaping supplies and in particular to an apparatus for stabilizing commercial tree-supporting and straightening stakes.

When young nursery grown trees are transplanted it is common practice to support each tree between two stakes, each eight to ten feet in length and about two inches in diameter. The stakes are driven into the ground about a foot and are spaced about twenty inches with the tree planted midway between them. The young tree may then be tied between the stakes for support and undesired bends in the trunk may even be straightened by drawing the trunk toward one or the other stakes.

When the ground becomes wet and when the wind blows against the young staked tree, the stakes will bend in the soft soil and tree support is lost. To maintain the stakes vertical and evenly spaced for proper tree support, it is the present practice to nail a 1×4 board across the stakes near their tops to stabilize the stakes and maintain the approximate twenty inch spacing at both top and bottom. It is necessary to use at least two nails at each end of the 1×4 board to prevent pivoting and the formation of a stake parallelog if the wind blows both stakes equally.

The cross-boarding of stakes is quite satisfactory when the stakes are used around short young trees, but when a tree grows to the point where its tender trunk can contact the 1×4 board the continuous rubbing of the tender trunk against the board will damage the cambium layer and seriously scar or possibly kill the tree.

The tree stake stabilizer disclosed herein rigidly holds a pair of tree stakes in a spaced vertical position without possibility of bending or parallelogramming and without possibility of the stabilizer contacting the tender bark of a young tree.

Briefly described, the tree stake stabilizer includes a pair of parallel tubular collars which closely fit around and are attached to conventional tree stake. The collars are about three inches in length so that there can be virtually no nonaxial movement between the collar and a round tree stake. The collars are interconnected about twenty inches apart by an adjustable-length arcuate bar that is arched so that it will clear the trunk of a tree. When the stabilizer is nailed to a pair of spaced tree stakes, a rigid frame is formed which cannot bend in wind or soft soil and to which a tree trunk may be tied with danger of damage to the cambium layer.

DESCRIPTION OF THE DRAWINGS

In the drawings which illustrate the preferred embodiment of invention.

DETAILED DESCRIPTION OF THE PREFERRED EMBODIMENT

Figure 1:
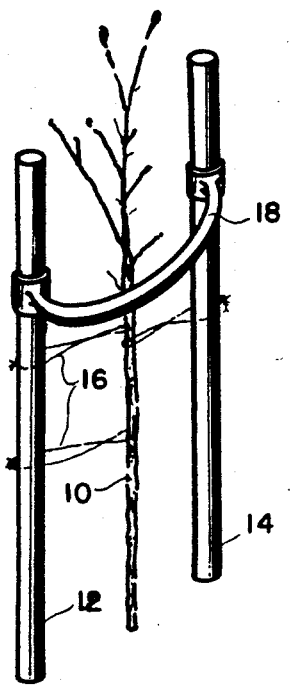
FIG. 1 is a perspective view of a young tree supported by a pair of tree stakes and a stabilizer.

FIG. 1 illustrates a small tree 10 planted between a pair of commercial type tree stakes 12, 14, which are normally two inches in diameter and eight to ten feet in length. Typically, the stakes are spaced twenty inches apart or ten inches each side of the base the tree 10 so that tree ties 16 may be applied to straighten the tree trunk or properly support the tree. To maintain the twenty inch spacing between the stakes and thus keep the stakes vertical in heavy winds and soft damp soil, the tree stake stabilizer 18 has been applied near the top of the two stakes 12, 14.

Figure 2:
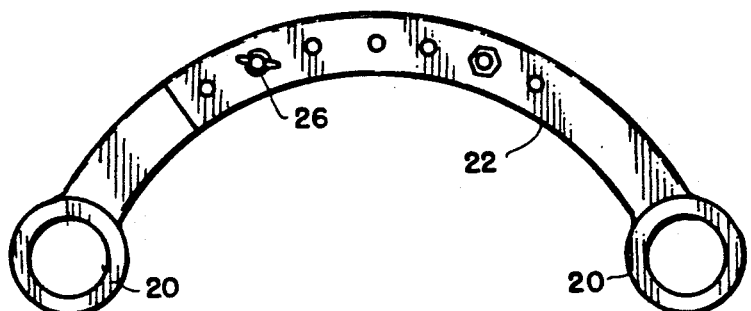
FIG. 2 is a plan view of the tree stake stabilizer.
Figure 3:
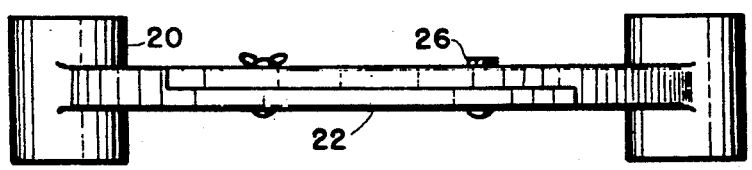
FIG. 3 is side elevational view of the stabilizer.
Figure 4:
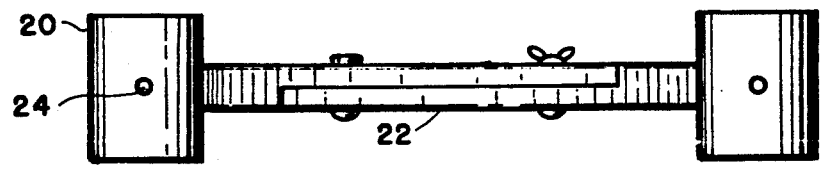
FIG. 4 is the opposite side elevational view thereof.

The tree stake stabilizer is shown in detail in FIGS. 2, 3 and 4 and comprises a pair of plastic tubular collars 20 interconnected by a rigid arcuate plastic bar 22 that maintains a fixed spacing between the collars As shown in FIG. 2, the collars 20 are tubular with an inside diameter slightly larger than the diameter of the tree stake to be used. Nearly all commercially available tree stakes are round dowels with a diameter of two inches so that the inside diameter of the collars would be approximately 2 ¼ inches. The outside dimension or configuration of the collar 20 is immaterial, but its wall thickness must be sufficient to provide adequate strength to the stabilizer in times of wind and rain storms.

The height of a collar 20 for a two inch tree stake should be approximately three inches so that the collar can grasp a three inch length of the stake without excessive nonaxial movement between them. This assures a right angle between the arcuate bar 22 and each stake, the maintaining of parallel stakes and a rigid tree supporting frame. When installed on a stake, the collar 20 is secured to the stake by a nail through the hole in the collar so that the possibility of all relative movement between stake and collar is removed The interconnecting bar 22 must be arched or arcuate as shown so that it will clear the tree planted midway between the stakes. The amount of offset of the bar from the chord between the centers of the collars 20 should be in the order of six inches to provide such clearance.

The arcuate bar 22 may be a solid piece about 1 b 51995926.001 ½ inches wide by one-inch thick or, if desired, may be divided into ½ inch thick arcuate bars that are overlapped and bolted together by bolts 26, as shown, to form an adjustable length bar 22 that may be adjusted between the chord lengths of about eighteen to twenty-four inches. The adjustment feature can therefore correct for inaccurately placed stakes and will assure that such tree stakes may be made parallel.

I claim:

1. A tree stake stabilizer for attachment to a pair of spaced tree stakes having round cross sections for providing rigidity to said pair and clearance to a tree planted between said pair, said stabilizer comprising:
   a pair of tubular collars for loosely engaging each stake of said pair of round tree stakes, the axes of said tubular collars being substantially parallel to each other;
   an adjustable length elongated bar having its ends connected to each of said tubular collars, said bar being arcuate to form a horizontal offset from the tree.

2. The tree stake stabilizer claimed in claim 1 wherein said elongated bar is connected at right angles to the axis of each of said collars.

3. The tree stake stabilizer claimed in claim 2 wherein said tubular collars have a nail hole for securing the collar to a tree stake.

* * * * *